Patented June 16, 1942

2,286,364

UNITED STATES PATENT OFFICE 2,286,364

GUANYL UREA SALTS OF MONOALKYL ESTERS OF SULPHURIC ACID

David Walker Jayne, Jr., Old Greenwich, and Harold Milton Day, Cos Cob, Conn., assignors to American Cyanamid Company, New York, N. Y., a corporation of Maine No Drawing. Application October 14, 1940, Serial No. 361,118

10 Claims. (Cl. 260—459)

The present invention relates to guanyl urea salts of monoalkyl esters of sulphuric acid and to the method of preparing the same.

It is known that guanyl urea sulphate is produced when dicyandiamide is heated with dilute sulphuric acid in accordance with the following reaction:

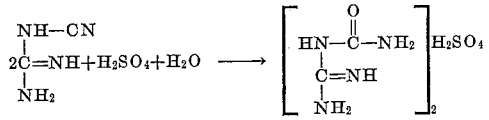

We have now discovered that the guanyl urea alkyl hydrogen sulphates may be prepared by heating one mole of dicyandiamide with one mole of sulphuric acid in the presence of at least one mole of a primary or secondary alcohol. The reaction is exothermic, so that cooling may be desirable under some circumstances to prevent loss of reactants. The formation of these new compounds may be illustrated by the following equation:

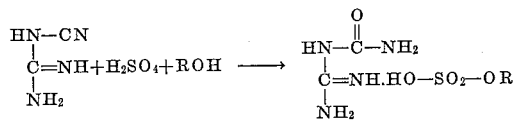

R representing an aliphatic hydrocarbon radical.

The invention will be illustrated in greater detail by the preparation of the compounds shown in the following examples. Parts indicated are by weight.

Example 1

A mixture of 85 parts of dicyandiamide, 102 parts of 66° Bé. sulphuric acid and 300 parts of anhydrous ethyl alcohol were placed in a reaction vessel and the reaction initiated by heating to approximately 70° C. The reaction proceeded with more or less vigor and the temperature of the mixture rose above the boiling point of the alcohol, resulting in removal of a considerable portion of the latter which was present in excess of the theoretical amount required. After the reaction had ceased, the mixture was cooled to about 25° C., and the damp crystalline mass airdried. The product, guanyl urea ethyl hydrogen sulphate, was a white crystalline material which melted at 135° C. with decomposition. It was readily soluble in water, quite soluble in ethyl alcohol, somewhat soluble in acetone, and insoluble in benzene and ether. Aqueous solutions gave a positive test for guanyl urea with nickel and copper, and a positive sulphate test with barium. The nitrogen content was found to be 24.50%, while theoretical for guanyl urea ethyl hydrogen sulfate is 24.55%. The yield was quantitative.

Example 2

42 parts of dicyandiamide were added to a mixture of 50 parts of 66° Bé. sulphuric acid and 150 parts of anhydrous secondary butyl alcohol. The slurry was heated to 70° C. whereupon a vigorous exothermic reaction took place. The mixture was cooled and the crystalline mass allowed to dry in the air. 127 parts of guanyl urea secondary butyl hydrogen sulphate were obtained. The product was a white crystalline water-soluble material.

Example 3

13 parts of 2-ethylhexyl alcohol, 9 parts of dicyandiamide and 10 parts of 66° Bé. sulphuric acid were mixed together in a reaction vessel and heated to 80° C. The reaction proceeded rapidly and the temperature of the mixture rose to approximately 145° C. Upon cooling to room temperature, the product, guanyl urea 2-ethylhexyl hydrogen sulphate, was a gray waxy material soluble in water and ethyl alcohol, and insoluble in acetone and hydrocarbons.

Example 4

A mixture of 9 parts of dicyandiamide, 10.5 parts of sulphuric acid and 19 parts of anhydrous n-dodecyl alcohol was heated to 75°–80° C. whereupon the reaction became exothermic and the temperature rose to a maximum of 155° C. After the reaction had ceased and upon cooling to room temperature, the guanyl urea dodecyl hydrogen sulphate was obtained as a white waxy material soluble in water to give a "soapy" solution, soluble in ethyl alcohol, and insoluble in hydrocarbons.

Example 5

4.5 parts of dicyandiamide were added to a mixture of 10.5 parts of sulphuric acid and 14 parts of n-octadecyl alcohol. The slurry was heated to 80° C. whereupon the reaction proceeded vigorously and the temperature rose to 140° C. Upon cooling to room temperature, the product, guanyl urea octadecyl hydrogen sulphate, was a gray hard wax-like material which softened at about 120° C. It was soluble in water to give a very "soapy" solution, and also soluble in hydrocarbons such as benzol, toluol, petroleum oils, naphthas, etc.

*Example 6*

A mixture of 9 parts of dicyandiamide, 10 parts of sulphuric acid, and 16 parts of butyl carbitol (mono-butyl ether of diethylene glycol) was heated to 70° C. A vigorous reaction set in and the temperature rose to a miximum of 170° C. Upon cooling, the product was a soft cream-colored paste, soluble in water and alcohol, and insoluble in acetone and hydrocarbons.

The compounds of this invention have a number of widely diversified uses, for example, as wetting agents, dispersing agents, and emulsifying agents. They are particularly useful in synthesis when a cheap and readily prepared alcohol-soluble guanyl urea salt is desired, or when it is desirable to use the equivalent of guanyl urea sulphate in alcoholic solution. The stearyl compound being soluble in hydrocarbons may be of value as a dry-cleaning soap.

While the invention has been described with particular reference to specific embodiments, it is to be understood that it is not to be limited thereto but is to be construed broadly and restricted solely by the scope of the appended claims.

We claim:

1. A method of preparing a guanyl urea alkyl hydrogen sulphate which comprises reacting together dicyandiamide, sulphuric acid and a member of the group consisting of primary and secondary alcohols.

2. The method of claim 1, in which the reactants are heated until reaction takes place.

3. The method of claim 1, in which the reactants are in a substantially anhydrous state.

4. The method of claim 1, in which the reactants are in an equimolecular ratio.

5. A method of preparing guanyl urea ethyl hydrogen sulphate which comprises heating a mixture of dicyandiamide, sulphuric acid and ethyl alcohol in equimolecular quantities, to a temperature of about 70° C., cooling the product to substantially 25° C. after the reaction has ceased, and drying the same.

6. A guanyl urea salt of a mono-alkyl ester of sulphuric acid.

7. A guanyl urea alkyl hydrogen sulphate of the formula:

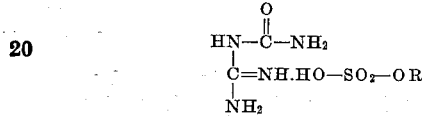

wherein R is an aliphatic hydrocarbon radical.

8. Guanyl urea ethyl hydrogen sulphate.

9. Guanyl urea dodecyl hydrogen sulphate.

10. Guanyl urea octodecyl hydrogen sulphate.

DAVID WALKER JAYNE, JR.
HAROLD MILTON DAY.

CERTIFICATE OF CORRECTION.

Patent No. 2,286,364. June 16, 1942.

DAVID WALKER JAYNE, JR., ET AL.

It is hereby certified that error appears in the printed specification of the above numbered patent requiring correction as follows: Page 2, first column, line 6, for "miximum" read --maximum--; page 2, first column, line 17, for "stearyl" read --octadecyl--; and second column, line 27, for "octodecyl" read --octadecyl--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.